US007536995B2

(12) United States Patent
Baldauf et al.

(10) Patent No.: US 7,536,995 B2
(45) Date of Patent: May 26, 2009

(54) METHOD FOR LIMITING THE POWER OUTPUT OF AN INTERNAL COMBUSTION ENGINE

(75) Inventors: Johannes Baldauf, Wangen (DE); Michael Walder, Ravensburg (DE); Ingo Wintruff, Kressbronn (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 308 days.

(21) Appl. No.: 11/709,323

(22) Filed: Feb. 21, 2007

(65) Prior Publication Data

US 2007/0208490 A1 Sep. 6, 2007

(30) Foreign Application Priority Data

Feb. 21, 2006 (DE) ....................... 10 2006 008 356

(51) Int. Cl.
*F02M 15/00* (2006.01)
*B60T 7/12* (2006.01)

(52) U.S. Cl. ....................... 123/434; 123/478; 123/480; 701/103

(58) Field of Classification Search ................. 701/103, 701/104, 110, 114, 115; 123/434, 673, 456, 123/478, 480
See application file for complete search history.

(56) References Cited

U.S. PATENT DOCUMENTS

| | | | | |
|---|---|---|---|---|
| 5,245,977 | A * | 9/1993 | Chen et al. | 123/590 |
| 5,988,151 | A * | 11/1999 | Schneider | 123/698 |
| 6,032,644 | A * | 3/2000 | Bederna et al. | 123/339.15 |
| 7,174,880 | B2 * | 2/2007 | Henn et al. | 123/436 |
| 2006/0054134 | A1 * | 3/2006 | Henn et al. | 123/325 |
| 2006/0089779 | A1 * | 4/2006 | Geyer et al. | 701/101 |
| 2006/0129306 | A1 * | 6/2006 | Lang et al. | 701/114 |
| 2006/0224298 | A1 * | 10/2006 | Lang | 701/114 |

FOREIGN PATENT DOCUMENTS

| | | |
|---|---|---|
| DE | 43 25 307 | 2/1995 |
| DE | 199 53 767 | 5/2001 |
| DE | 10 2004 017 052 | 11/2005 |
| EP | 1 002 192 | 1/1999 |

* cited by examiner

*Primary Examiner*—John T Kwon
(74) *Attorney, Agent, or Firm*—Klaus J. Bach

(57) ABSTRACT

In a method for limiting the power output of an internal combustion engine, an air mass flow deviation of an actual air mass flow (mL(IST)) from a reference air mass flow (ML (REF)) is determined and, depending on the air mass flow deviation, a power output reduction is determined by which the maximum power output limit of the internal combustion engine is to be reduced in order to prevent overheating of the internal combustion engine.

6 Claims, 3 Drawing Sheets

METHOD FOR LIMITING THE POWER OUTPUT OF AN INTERNAL COMBUSTION ENGINE

BACKGROUND OF THE INVENTION

The invention resides in a method for limiting the power output of an internal combustion engine wherein an air mass flow deviation of an actual air mass flow from a reference air mass flow is determined and, dependent thereon, a power output reduction is determined by which the maximum power output limit of the internal combustion engine is lowered.

In systems such as they are known, for example, from DE 43 25 307 A1 for a protection from excessively high exhaust gas temperatures, the momentary temperature of the exhaust gas is calculated from other values and is compared with a limit value. If the momentary temperature is above a certain limit value, the fuel injection into certain cylinders is cut. This however results in a non-uniform power output of the internal combustion engine.

It is the object of the present invention to provide a method by which the engine is protected from excessive exhaust gas temperatures without negative secondary effects.

SUMMARY OF THE INVENTION

In a method for limiting the power output of an internal combustion engine, an air mass flow deviation of an actual air mass flow (mL(IST)) from a reference air mass flow (ML (REF)) is determined and, depending on the air mass flow deviation, a power output reduction is determined by which the maximum power output limit of the internal combustion engine is to be reduced in order to prevent overheating of the internal combustion engine.

The reference air mass flow is calculated by the engine manufacturer from the engine operating state. The engine operating state is determined on the basis of the engine speed and the power output. For example, for a measured drive torque the engine power output is calculated from which then, via a performance graph, the reference air mass flow is calculated depending on the engine speed. Depending on the air mass flow deviation, then a power output reduction is determined for limiting the power output of the internal combustion engine.

With the method according to the invention, the internal combustion engine is effectively protected from thermal overload when the ambient conditions are changed, for example, when the geodetic height is changed or an air filter is clogged. It is known, that, under such extreme ambient condition, the air mass flow to the engine drops. A reduced air mass flow however results in a reduced heat capacity of the charge air mass flow which results in an increase of the exhaust gas temperature, which again may thermally overload the internal combustion engine.

With the method according to the present invention, the maximum admissible exhaust gas temperature is not exceeded by providing a motor-specific power output reduction when necessary. As a control value for the power output reduction, the air mass flow deviation is particularly suitable since the exhaust gas temperature is directly dependent thereon. The power output reduction is established by a uniform reduction of the fuel injection amount for all the cylinders or by an engine output torque-based engine control wherein the torque contribution of all the cylinders is reduced at the same rate. In any case, a smooth running of the engine is maintained.

In a particular embodiment of the invention, the power output reduction of the engine is determined via a characteristic line or a performance graph, wherein as input values for the performance graph the air mass flow deviation and the engine speed are used. Instationary conditions such as acceleration procedures or load additions in electric generators for example are eliminated by passing the air mass flow deviation signal through a filter with a variable edge frequency. Typically, a filter with a PTI behavior is used for that purpose.

The method according to the invention can be easily integrated into already existing programs of electronic engine control systems so that the expenses are relatively low.

Below, a preferred embodiment of the invention will be described on the basis of the accompanying drawings.

DESCRIPTION OF A PREFERRED EMBODIMENT

Figure 1:
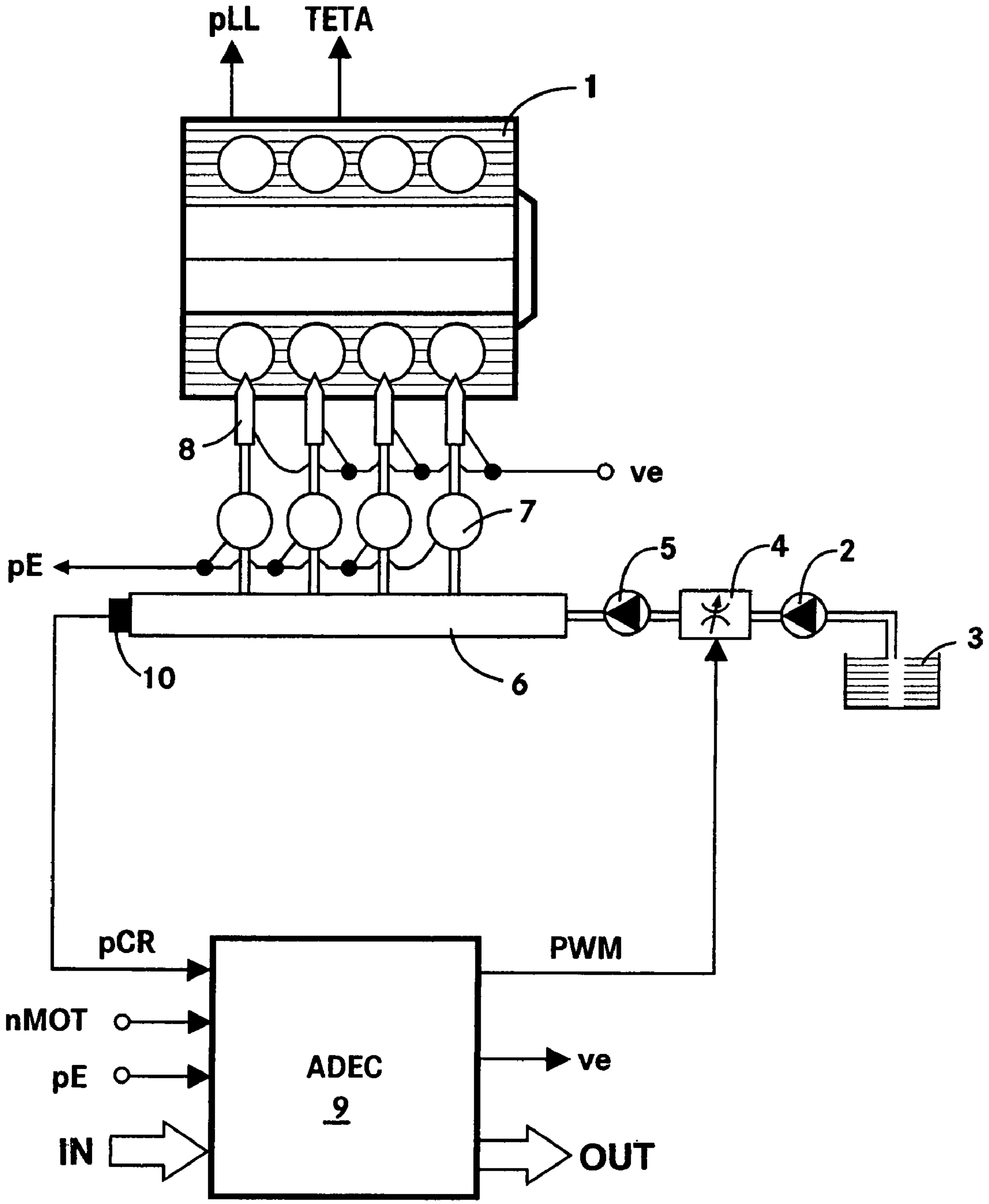
FIG. 1 shows schematically an engine with an engine power output limiting arrangement.

FIG. 1 shows a control system for an internal combustion engine with a common rail fuel injection system. The common rail fuel injection system includes the following components: A low pressure pump 2 for pumping fuel from a fuel tank 3, a controllable suction throttle valve 4 for controlling the fuel flow volume, a high pressure pump 5 for pressurizing the fuel, a rail 6 and individual storage chambers 7 for storing fuel under pressure and injectors 8 for injecting the fuel into the various combustion chambers of the internal combustion engine 1.

Operation of the engine 1 is controlled by an electronic control unit (ADEC) 9. The electronic control unit 9 includes the usual components of a microcomputer system such as a micro-processor, I/O components, buffer and storage devices (EEPROM, RAM). The storage devices contain the operating data relevant for the operation of the internal combustion engine 1. By means of these data, the electronic control unit 9 calculates output values on the basis of the input values. As example, in FIG. 1, the following input values are shown: a rail pressure pCR which is measured by means of a rail pressure sensor 10, a rotational engine speed nMOT, the individual storage chamber pressures pE and an input value EIN. The input value EIN comprises for example the charge air pressure pLL as well as the charge air temperature TETA of an exhaust gas turbocharger, an ambient air pressure, an ambient air temperature and the temperatures of the coolant and of the lubricant and also of the fuel.

As output values of the electronic control unit 9, FIG. 1, shows a signal PWM for controlling the suction throttle valve 4, a signal ve for controlling the fuel injectors 8 and an output signal AUS. The output signal AUS in representative for the additional control signals for controlling the internal combustion engine 1. The signal ve represents a power output determining control signal, for example, for a fuel injection amount or an engine torque.

Figure 2:
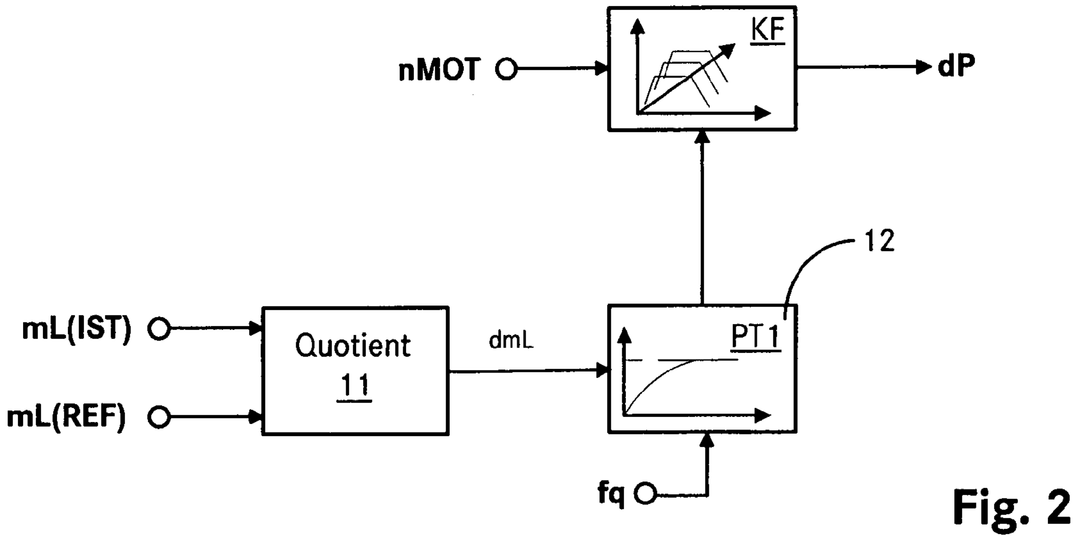
FIG. 2 shows a block diagram for generating an engine control signal.

FIG. 2 shows a block diagram for the calculation of the power output reduction ΔP. The block diagram forms a corresponding software section of the electronic control unit. From the actual air mass flow mL(IST) and the reference air mass flow mL(REF), the air mass flow deviation is calculated via function block 11 (quotient formation). The actual air mass flow mL(IST) is calculated using the gas equation from the charge air pressure pLL and the charge air temperature TETA. Then the air mass flow deviation signal dmL is filtered by a filter 12 with variable edge frequency fq. By way of the filter 12, the instationary states such as acceleration procedures or load additions in electric generators are omitted. Typically, a filter with PT1 response is used for this purpose. The output value of the filter 12 becomes an input value for a performance graph KF. The second input value corresponds to the momentary engine speed mMOT. By way of the performance graph KF for the air mass flow deviation for the momentary operating point (engine speed), a power output reduction dP is determined.

Figure 3A:
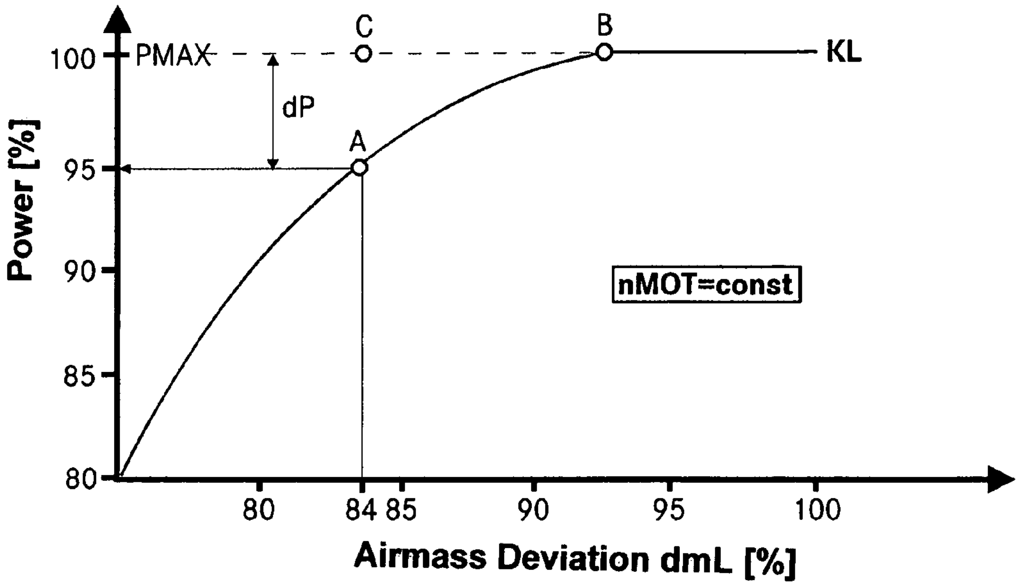
FIG. 3A and FIG. 3B show engine performance graphs.
Figure 3B:
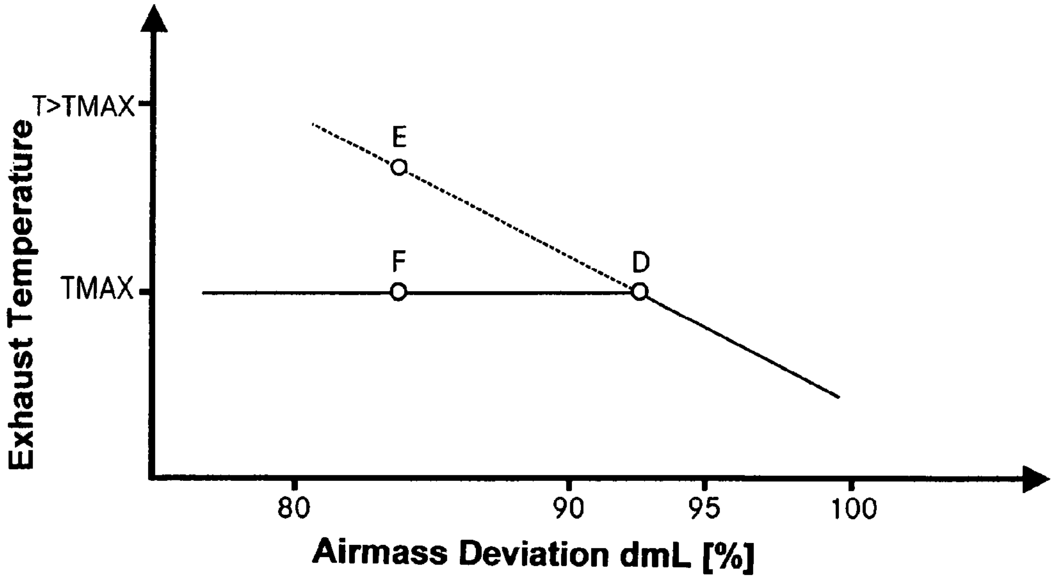

FIGS. 3A and 3B are interdependent. They cover two examples wherein the dashed line represents an example without power output reduction and the solid line represents a process in accordance with the invention.

FIG. 3A shows a characteristic line KL of the performance graph KF for a constant engine speed nMOT. On the base, the air flow mass deviation dmL in % is indicated. The air mass flow deviation dmL is calculated as the quotient of the actual air mass flow mL(IST) and the reference air mass flow mL(REF). The reference air mass flow mL(REF) is calculated and provided by the manufacture of the internal combustion engine dependent on the engine operating state. The operating state is determined based on engine speed and engine power output. For example, from the measured drive torque, the power output is calculated from which then, via a performance graph, the reference air mass flow dependent on the engine speed is calculated. On the ordinate of FIG. 3A, the power output of the internal combustion engine is plotted. Via the characteristic line KL, a certain power output value is assigned to a particular air mass flow deviation dmL, that is, the maximally possible power output PMAX is correspondingly reduced. Also in FIG. 3B, on the base, the air mass flow deviation dmL in % is indicated. On the ordinate, the exhaust gas temperature is shown.

In the first case, that is, without power output limitation (dashed line), the arrangement has the following functionality: In point B of FIG. 3A, the air mass flow deviation dmL is about 93%. To this air mass flow deviation dmL, a power output of 100% is assigned, that is, the power output of the internal combustion engine is not limited. In FIG. 3B, the point D with the maximally admissible exhaust gas temperature TMAX corresponds to point B of FIG. 3A. If now the momentary air mass flow mL(IST) drops, for example as a result of a clogging air filter, the air mass flow deviation dmL also drops. In FIG. 3A, the air mass flow deviation, starting out from the point B, drops along the dashed line toward the point C.

Also in point C, the internal combustion engine is operated under 100% power output. A reduction in the air mass flow deviation results in a lower heat capacity of the air charge which, again, results in an increase of the exhaust gas temperature. In FIG. 3B therefore, the exhaust gas temperature rises along the dashed line in the direction toward the point E with a temperature value higher than TMAX. If the air mass flow deviation dmL further decreases at constant power output a thermal overload of, and damage to, the internal combustion engine will be the result.

In the second case, that is with power output limitation (solid line), the arrangement has the following functionality.

To an air mass flow deviation of 84% a power output value of 95% is assigned via the characteristic line KL, point A.

The maximally possible power output PMMAX is consequently reduced by a power output reduction value dP of 5%. The power output of the internal combustion engine is depicted by way of the power output determining signal ve representing a fuel injection amount or, with a torque-based architecture, as a torque.

Air mass flow deviations occur with changing operating conditions, for example, large geodetic height or changing characteristic engine values, for example, a clogging air filter. As a result of the power output reduction, the exhaust gas temperature remains at the constant value TMAX, see FIG. 3B, point F.

The method for limiting the power output of an internal combustion engine in accordance with the invention provides for the following advantages:

- improved overload protection with changing ambient conditions for example changing geodetic height, clogging air filter,
- by filtering the air flow mass deviation signal, instationary conditions such as acceleration or load addition in electric generators are omitted,
- the fuel injection amount into, and the torque output of all cylinders are reduced uniformly by the same amount so the smooth engine operation is maintained
- the function can be applied as a supplement to existing engine control systems since no hardware changes are needed for the electronic control unit
- the additional expenses for the protection of the internal combustion engine are quite moderate.

What is claimed is:

1. A method for limiting the power output of an internal combustion engine (1), comprising the steps of:

determining an air mass flow deviation (dmL) of an actual air mass flow (mL(IST)) from a reference air mass flow (mL(REF)), determining, depending on the air mass flow deviation, an engine power output reduction (dP) by which an engine power output (PMAX) limit of the internal combustion engine (1) is to be reduced in order to prevent overheating of the internal combustion engine, and establishing such limit.

2. A method according to claim 1, wherein the power output reduction (dP) is determined by one of a characteristic line (KL) and a performance graph (KF) wherein the input values of the performance graph (KE) are the air mass flow deviation (dmL) and a rotational engine speed (nMOT).

3. A method according to claim 2, wherein the air mass flow deviation (dmL) signal is filtered by a filter (12).

4. A method according to claim 3, wherein the filter is a PTI-filter.

5. A method according to claim 4, wherein the filter has a variable edge frequency ($f_q$) filter.

6. The method according to claim 1, wherein the power output reduction (dP) is based on one of a fuel injection amount and an engine torque.

* * * * *